Sept. 26, 1944.　　　　E. KILAYIN　　　　2,359,120
ROLLER CAGE
Filed March 25, 1944

INVENTOR
Emanuel Kilayin
BY Cam Hau Gravely
His ATTORNEYS.

Patented Sept. 26, 1944

2,359,120

UNITED STATES PATENT OFFICE 2,359,120

ROLLER CAGE

Emanoel Kilayin, Birmingham, England, assignor to The Timken Roller Bearing Company, Canton, Ohio, a corporation of Ohio Application March 25, 1944, Serial No. 528,020
In Great Britain November 13, 1942

1 Claim. (Cl. 308—217)

This invention relates to roller bearings and to the roller-guiding cages thereof, said bearings being either of the taper-roller or parallel-roller type, with or without one or more flanges or ribs on the inner or outer race member for co-operation with the roller ends, and the cages being of the kind consisting of a ring or annular body part having therein apertures or pockets for receiving the rollers.

One of the objects of the invention is to provide an improved roller bearing cage which will enable the rollers to be readily assembled upon or within an inner or outer race member having one or more flanges or ribs, without the necessity of bending or deforming the cage to enable the rollers to be passed over a flange or rib; and which will then ensure the said race member, cage and rollers being held together as a self-contained unit.

Another object is to provide an improved pre-assembled cage and roller combination wherein the rollers are held within the cage without the possibility of falling out, so that the cage and rollers form a self-contained assembly that can be handled as a unit.

A further object is to provide an improved roller-guiding cage which permits of the rollers being readily assembled and held within the apertures or pockets thereof, either before or after the cage has been located in its working position in relation to a race member, without the necessity of bending or deforming the cage body.

According to the invention, a roller-bearing cage comprises a cage ring or annular body having roller-receiving apertures or pockets therein, and one or more resilient tongues, ears or projections extending either inwardly or outwardly from the cage body adjacent a side of each aperture or pocket and co-operating with an opposite edge of the aperture or pocket, so as to permit of a roller being inserted into the aperture or pocket by being forced past said tongues or the like by a snap action.

Also, according to the invention, a self-contained roller and cage assembly for a roller bearing comprises a cage ring or annular body, rollers located in apertures or pockets which are of less width than the diameter of the rollers at a given point in their length so that said rollers project to different distances from the respective inner and outer peripheries of the cage, and a resilient tongue, ear or projection extending either inwardly or outwardly from the cage body, adjacent a side of each aperture or pocket, so as to extend over the surface of the larger projecting portion of the roller in said aperture or pocket, the distance between the outer end of said tongue or the like and the opposite edge of the aperture or pocket being less than the diameter of the roller at the corresponding point in its length, each roller being sprung into its aperture or pocket past the said tongue or the like and being retained thereby.

Further, according to the invention, a roller bearing assembly comprises the combination of a race member having one or more thrust ribs thereon, a cage ring or annular body having roller-receiving pockets therein, rollers in the pockets, and a resilient tongue, ear or projection extending from a point adjacent one side of each pocket in a direction away from the race member, the distance between the end of said tongue or the like and the opposite edge of the pocket being less than the diameter of a roller at the corresponding point in its length; the rollers being sprung into the pockets past the tongues or the like, which retain them in place, and the race member, cage and rollers forming a self-contained unit assembly.

Figure 1 of the accompanying drawing is a cross section through a taper roller bearing assembly in accordance with the one form of the present invention.

Figure 1:
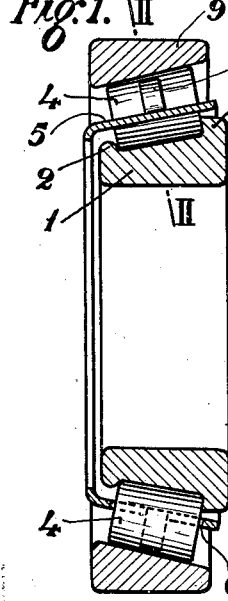
Figure 2:
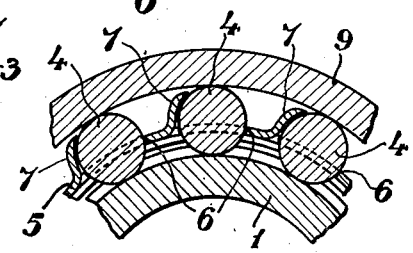
Figure 2 is a part circumferential section on line II, Figure 1.
Figure 3:
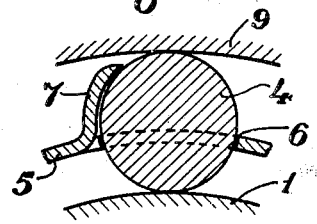
Figure 3 is a fragmentary section through one of the rollers and adjacent portion of the cage, upon a larger scale.
Figure 4:
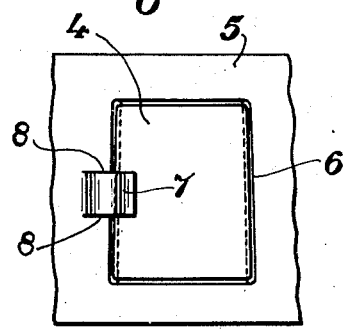
Figure 4 is a plan view of a portion of the cage with a roller therein.

Referring to Figures 1 to 4, which show one embodiment of the invention in connection with a taper roller bearing having a cone or inner race member 1 provided at opposite ends of its conical race surface with thrust or guiding flanges or ribs 2, 3; co-operating with the ends of the rollers 4, the cage, for spacing and guiding the rollers, consists of a conical ring or body part 5 having therein tapering apertures or pockets 6 in which the rollers are located, the width of such pockets, at any point in their length, being less than the diameter of the rollers at corresponding points in their length, so that said rollers cannot pass completely through the pockets, but extend through them, on the inside of the cage, for a distance less than half their diameter at any point, in order to engage and roll upon the race surface of the cone 1. The opposite side edges of each pocket may be chamfered or bevelled to correspond approximately to the opposed curved surfaces of the rollers, and the usual small clearance between said edges and the rollers, when the bearing is in operation, is provided for. At a point about mid-way along one edge of each pocket 6 a resilient tongue, ear or projection 7 is struck up, being integral with the cage body and being bent between two parallel slits 8, 8 (Figure 4), formed in said edge, so that it stands clear, and is displaced slightly inwards, of the surface of the edge. The said tongue or the like 7 extends outwardly of the cage body, that is, away from the bearing cone 1 having the flanges or ribs 2, 3, and it is slightly curved or bent over to follow generally the curvature of the roller and to such a position that the distance between its outer end and the opposite edge of the pocket is slightly less than the diameter of the roller at a point in its length corresponding to the position of the tongue, so that the roller can only enter the pocket by being forced past the tongue which then slightly yields while the roller is passing it, and then returns to its initial position, the roller entering the pocket with a snap action, and being retained therein by the tongue 7 above it and by the sides of the pocket below its axis. In assembling the rollers 4 on to the cone 1, the cage 5 is first positioned over the cone and the rollers 4 are then pressed into their respective pockets 6 from outside the cage, each snapping past the resilient tongue 7 of its pocket. The rollers are then held axially between the flanges or ribs 2, 3, on the cone; and as they cannot fall out of the pockets in an outward radial direction due to the slightly overlapping resilient tongues 7, the bearing assembly, including the cone, cage and rollers, forms a self-contained assembly that can be handled as a unit. The bearing is completed by inserting the assembly into the usual cup member 9 having an interior tapered race surface. The tongues or the like 7 are so shaped or positioned that when the bearing is in use they are out of contact with the rollers.

Figure 6:
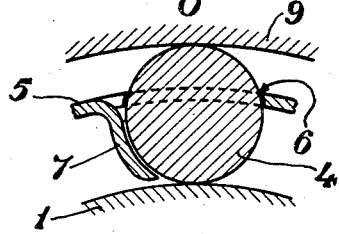
Figure 6 is a section, upon a larger scale, corresponding to line VI—VI, Figure 5.
Figure 5:
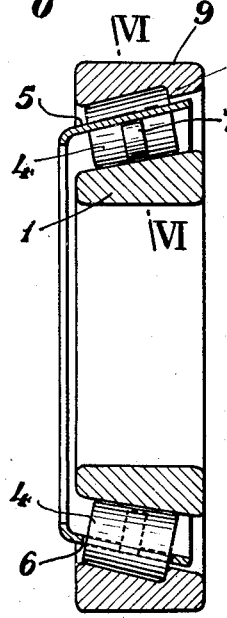
Figure 5 is a cross section through a taper roller bearing assembly in accordance with another form of the invention.

Figures 5 and 6 show the application of the invention to a tapered roller bearing in which a plain cone 1 without ribs is employed, but the cup 9 has an interior thrust flange or rib 10 at its larger end. The cage 5 is of a very similar nature to that described in connection with Figures 1 to 4, but the resilient tongues 7 in this case project inwardly, that is, away from the cup member 9, and when the cage has been placed within the cup the rollers 4 are inserted into their pockets 6 from the inside of the cage, being forced past the said resilient tongues 7 with a snap action. The rollers are held axially by the flange 10 and tapered surface of the cup 9 and cannot fall out of their pockets by reason of the tongues 7, so that the cup, cage and rollers form a self-contained assembly that can be handled as a unit.

Figure 7:
Figures 7 and 8 are cross sections through two different forms of parallel-roller bearings to which the invention is applied.
Figure 8:
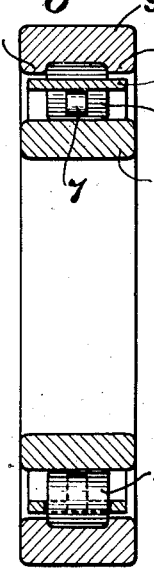

As shown in Figures 7 and 8, the invention can equally be applied to roller bearings having parallel rollers 4 and parallel race members 1, 9, with two spaced thrust ribs 2, 3, either on the inner member 1, as in Figure 7, or on the outer member 9, as in Figure 8. In both cases the cage ring or body 5 would be of cylindrical form, the resilient tongues 7 extending from it in a direction away from the member having the flanges or ribs 2, 3.

Figure 9:
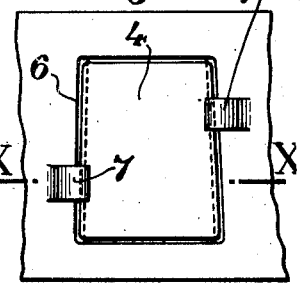
Figure 9 is a plan view showing a modified arrangement of the resilient retaining tongues.
Figure 10:
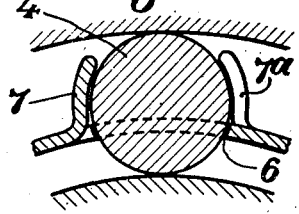
Figure 10 is a cross section on line X—X, Figure 9.

In the modification represented in Figures 9 and 10, there may be two resilient tongues, 7, 7a, to each pocket 6, being disposed adjacent opposite edges, but they are not directly opposite to one another, being arranged in staggered relationship, one at a point about two-thirds along one edge from one end of the pocket, and the other at a point about two-thirds along the other edge from the opposite end of the pocket. The roller 4 can be forced past the tongues into the pocket, with a snap action, by skewing or tilting it while being pressed against the tongues.

If desired, instead of only a single tongue being provided along a pocket edge, two or more separate tongues may be so provided. The tongue or tongues may be of any desired width so as to extend along any desired portion of the length of the pocket.

The invention may also be applied to roller bearings without flanges or ribs on the race members. The cage with its sprung-in rollers, as herein described with reference to Figures 1 to 4, Figures 5 and 6, Figure 7, Figure 8 or Figures 9 and 10, is then pre-assembled to form a self-contained unit, and can be fitted between the said race members in the usual manner.

I claim:

A cage ring having roller-receiving pockets therein, rollers in the pockets, and a single resilient tongue provided upon each edge of each pocket and extending in the same direction away from the cage ring, the distance between the end of each tongue and the opposite edge of the pocket being less than the diameter of a roller at the corresponding point in its length, said tongues on opposite edges of the pocket being arranged in spaced staggered relationship, so that a roller can be forced past the tongues into the pocket, with a snap action, by skewing it while being pressed against the tongues, said cage and rollers forming a self-contained unit assembly.

EMANOEL KILAYIN.